US008645373B2

(12) United States Patent
Knight et al.

(10) Patent No.: US 8,645,373 B2
(45) Date of Patent: Feb. 4, 2014

(54) COMPUTER IMPLEMENTED METHOD FOR AUTOMATICALLY GENERATING RECOMMENDATIONS FOR DIGITAL MEDIA CONTENT

(75) Inventors: Mark Knight, Surrey (GB); Christopher Evans, London (GB); Tom Boswell, London (GB)

(73) Assignee: Omnifone Limited, London (GB)

( * ) Notice: Subject to any disclaimer, the term of this patent is extended or adjusted under 35 U.S.C. 154(b) by 0 days.

(21) Appl. No.: 13/382,627

(22) PCT Filed: Jul. 6, 2010

(86) PCT No.: PCT/GB2010/051113
§ 371 (c)(1),
(2), (4) Date: Mar. 27, 2012

(87) PCT Pub. No.: WO2011/004185
PCT Pub. Date: Jan. 13, 2011

(65) Prior Publication Data
US 2012/0179693 A1 Jul. 12, 2012

(30) Foreign Application Priority Data

Jul. 6, 2009 (GB) .................................. 0911651.8
Dec. 9, 2009 (GB) .................................. 0921542.7

(51) Int. Cl.
*G06F 17/30* (2006.01)
(52) U.S. Cl.
USPC ........... 707/733; 707/736; 709/201; 709/203; 709/204; 709/213; 709/217; 715/733; 725/14; 725/46

(58) Field of Classification Search
USPC ............ 707/733, 736, 33; 709/204, 201, 203, 709/213, 217; 715/733; 725/14, 46
See application file for complete search history.

(56) References Cited

U.S. PATENT DOCUMENTS

| 6,438,579 | B1 | | 8/2002 | Hosken | |
|---|---|---|---|---|---|
| 7,865,571 | B2 | * | 1/2011 | Ho et al. | ....................... 709/217 |
| 7,865,572 | B2 | * | 1/2011 | Ho et al. | ....................... 709/217 |
| 7,937,451 | B2 | * | 5/2011 | Ho et al. | ....................... 709/217 |
| 8,200,667 | B2 | * | 6/2012 | Choe et al. | ................... 707/733 |
| 2008/0134043 | A1 | * | 6/2008 | Georgis et al. | ................ 715/733 |
| 2008/0306807 | A1 | | 12/2008 | Amento et al. | |
| 2009/0063568 | A1 | * | 3/2009 | Choe et al. | ................. 707/104.1 |
| 2009/0083117 | A1 | | 3/2009 | Svendsen et al. | |

(Continued)

FOREIGN PATENT DOCUMENTS

| WO | 2007/075622 A2 | 7/2007 |
|---|---|---|
| WO | 2008/026495 A1 | 3/2008 |

OTHER PUBLICATIONS

International Preliminary Report on Patentability and Written Opinion, dated Jan. 10, 2012, issued in priority International Application No. PCT/GB2010/051113.
International Search Report, dated Oct. 12, 2010, issued in priority International Application No. PCT/GB2010/051113.

*Primary Examiner* — Frantz Coby
(74) *Attorney, Agent, or Firm* — Saul Ewing LLP

(57) ABSTRACT

A computer implemented process encompasses the following steps: Identify the user's current media content library/ies; Analyze the content of those libraries, deriving a "taste signature" for the user from that analysis; Match the derived "taste signature" to other media content and to other users; and provide the user with recommendations based on that automatic matching process.

23 Claims, 9 Drawing Sheets

(56) References Cited

U.S. PATENT DOCUMENTS

Figure 1:
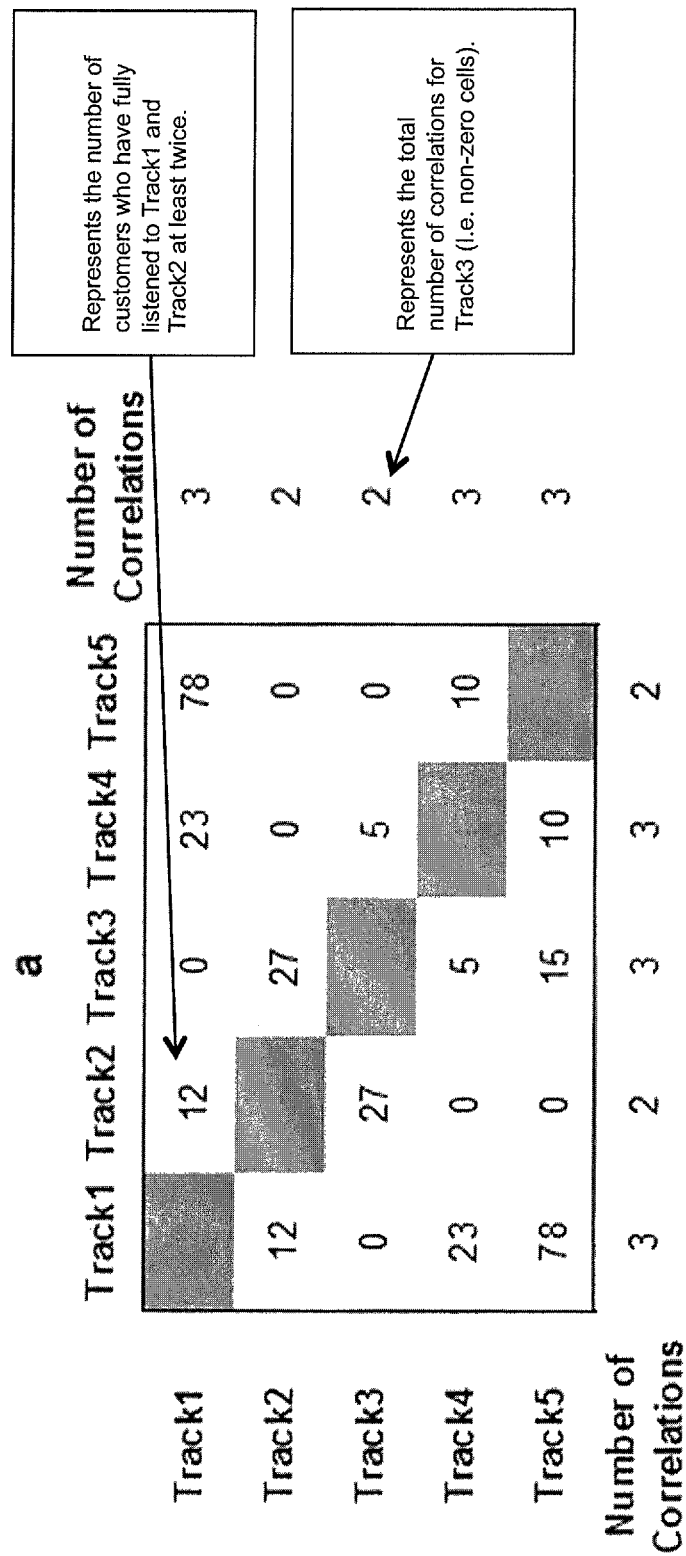

| | | | |
|---|---|---|---|
| 2009/0100469 A1* | 4/2009 | Conradt et al. | 725/46 |
| 2009/0164400 A1 | 6/2009 | Amer-Yahia et al. | |
| 2010/0010986 A1 | 1/2010 | Icho et al. | |
| 2010/0325205 A1* | 12/2010 | Murphy et al. | 709/204 |
| 2011/0072448 A1* | 3/2011 | Stiers et al. | 725/10 |
| 2011/0088051 A1* | 4/2011 | Zhu et al. | 725/14 |
| 2012/0117488 A1* | 5/2012 | Amidon et al. | 715/753 |
| 2012/0254170 A1* | 10/2012 | Choe et al. | 707/736 |

* cited by examiner

Figure 2

|  | Track1 | Track2 | Track3 | Track4 | Track5 | Weighting Sum |
|---|---|---|---|---|---|---|
| Track1 |  | 34.00 | 0.00 | 13.15 | 44.61 | 91.77 |
| Track2 | 34.00 |  | 76.50 | 0.00 | 0.00 | 110.50 |
| Track3 | 0.00 | 76.50 |  | 2.86 | 8.58 | 87.94 |
| Track4 | 13.15 | 0.00 | 2.86 |  | 5.72 | 21.73 |
| Track5 | 44.61 | 0.00 | 8.58 | 5.72 |  | 58.91 |
| Weighting Sum | 91.77 | 110.50 | 87.94 | 21.73 | 58.91 |  | a b

Figure 6a

| Functionality | Description | Associations Matrix based on? | Input(s) to recommendation process | Results mechanism* |
|---|---|---|---|---|
| "More like this" Track | In the More like this scenarios, a seed Track, Album or Artist is selected by the customer. The recommendations engine disclosed by this invention then provides a sequence of Tracks, Albums or Artists based on the seed, which can optionally be used as a Playlist by the customer. | Track Associations Matrix | The seed Track | Sequence of 10 distinct recommended Tracks in descending of order of closeness of fit (i.e. PCA correlation value).<br><br>Filtered out of this returned list are:<br>• The seed Track.<br>• Tracks that are not available on the customer's service.<br>• Tracks that the customer already owns or has fully listened to.<br>• Tracks, or Tracks from Albums or Artists, that the customer has rated as Hate it!<br><br>Returned Tracks should be from a variety of Artists. No more than 2 Tracks should be for the same Artist. |
| "More like this" Artist | As above. | Artist Associations Matrix | The seed Artist. | Sequence of 10 distinct recommended Artists in descending of order of closeness of fit (i.e. PCA correlation value).<br><br>Filtered out of this returned list are:<br>• The seed Artist<br>• Artists that are not available on the customer's service.<br>• Artists for which the customer has already fully listened to 50% of their catalogue.<br>• Artists that the customer has rated as Hate it! |

\* in all cases, if no recommendations are available (e.g. all correlations are zero), then simply return the most popular entities (but conforming to the post-filters like not including Hate-it! Material.

Figure 6b

| Functionality | Description | Associations Matrix based on? | Input(s) to recommendation process | Results mechanism* |
|---|---|---|---|---|
| "More like this" Album | As above. | Artist Associations Matrix<br><br>Note that this solution avoids the creation of an Album Associations Matrix, though in some example embodiments such a matrix may be created using the techniques disclosed above. | The seed Artist of the Release. | Sequence of 10 distinct recommended Albums (Releases), based on a cross-section of the Albums produced by the Artists with the highest closeness of fit (i.e. PCA correlation value).<br><br>Filtered out of this returned list are:<br>• The seed Album.<br>• Albums that are not available on the customer's service.<br>• Albums for which the customer has already fully listened to at least 50% of the Tracks.<br>• Albums that the customer has rated as Hate it!, and Albums from Artists that the customer has rated as Hate it!**<br><br>Returned Albums should be from a variety of Artists. No more than 2 Albums should be for the same Artist. |
| Tracks "You might like" | Tracks, Albums, Artists, and Playlists that "You might like" is a sequence of 10 recommended Tracks, Albums, Artists, and Playlists that are based upon your recent listening habits. The list is available form the Artist/Album/Track/Playlist screens. | Track Associations Matrix | 10 distinct Tracks made up of:<br>• The most recent Tracks rated a Love It! (up to a maximum of 5)<br>• The most recent Tracks that have been fully-listened to at least twice, to make up the remaining Tracks.<br><br>Excluded as inputs are Tracks the customer had flagged as Hate It! Regardless of how many times listened to. | Sequence of 10 distinct recommended Tracks in descending of order of closeness of fit (i.e. PCA correlation value).<br><br>Filtered out of this returned list are:<br>• The seed Tracks.<br>• Tracks that are not available on the customer's service.<br>• Tracks that the customer already owns or has fully listened to.<br>• Tracks, or Tracks from Albums or Artists, that the customer has rated as Hate it!<br><br>Additionally the system will seek to return the best correlated two new Tracks that are one-week old new releases in the system, replacing the least highly correlated Tracks in the 10 returned.<br><br>Returned Tracks should be from a variety of Artists. No more than 2 Tracks should be for the same Artist. |

\* in all cases, if no recommendations are available (e.g. all correlations are zero), then simply return the most popular entities (but conforming to the post-filters like not including Hate-it! Material.

Figure 6c

| Functionality | Description | Associations Matrix based on? | Input(s) to recommendation process | Results mechanism* |
|---|---|---|---|---|
| Artists "You might like" | As above. | Artist Associations Matrix | 10 distinct Artists made up of:<br>• The most recent Artists rated a Love It! (up to a maximum of 5)<br>• The most recent Artists for which Tracks have been fully-listened to at least twice, to make up the remaining Artists.<br><br>Excluded as inputs are Artists the customer had flagged as Hate It! Regardless of how many times listened to. | Sequence of 10 distinct recommended Artists in descending of order of closeness of fit (i.e. PCA correlation value).<br><br>Filtered out of this returned list are:<br>• The seed Artists.<br>• Artists that are not available on the customer's service.<br>• Artists for which the customer has already fully listened to 50% of their catalogue.<br>• Artists that the customer has rated as Hate it!<br><br>Additionally the system will seek to return the best correlated two new Artists that are one-week old new releases in the system, replacing the least highly correlated Artists in the 10 returned. |
| Albums "You might like" | As Above. | Artist Associations Matrix | As above. | Sequence of 10 distinct recommended Albums in descending of order of closeness of fit (i.e. PCA correlation value).<br><br>Filtered out of this returned list are:<br>• The seed Albums.<br>• Albums that are not available on the customer's service.<br>• Albums for which the customer has already fully listened to at least 50% of the Tracks.<br>• Albums that the customer has rated as Hate it!, and Albums from Artists that the customer has rated as Hate it!<br><br>Additionally the system will seek to return the best correlated two Artists that are one-week old new releases in the system, replacing the least highly correlated Artists in the 10 returned.<br><br>Returned Albums should be from a variety of Artists. No more than 2 Albums should be for the same Artist. |

* in all cases, if no recommendations are available (e.g. all correlations are zero), then simply return the most popular entities (but conforming to the post-filters like not including Hate-it! Material.

Figure 6d

| Functionality | Description | Associations Matrix based on? | Input(s) to recommendation process | Results mechanism* |
|---|---|---|---|---|
| "Recommended Members" | Recommended members are customers that are similar to the source customer based upon rating and listening habits. They are listed on the Cool Members screen on the Buzz tab. | Customer Associations Matrix | The current customer. | Sequence of 10 distinct recommended Customers in descending of order of closeness of fit for the customer's service.<br><br>Filtered out of this returned list are:<br>• Customers who are already friends.<br>• Customers who have been blocked.<br><br>Additionally the system will seek to return the best correlated two new Customers that are one-week old new releases in the system, replacing the least highly correlated Customers in the 10 returned. |
| Playlists "You might like" | Playlists "You might like" are Playlists that have been shared by other customers within the same service. | Customers Associations Matrix | The current customer. | Sequence of 10 distinct recommended Playlists taken from the customers who are closest to the current customer, in descending of order of closeness of fit.<br><br>Filtered out of this returned list are:<br>• Playlists from customers who are already friends.<br>• Playlists from customers who have been blocked.<br>• Playlists that the customer has already listened to at least once.<br>• Playlists for which the customer has already fully listened to at least 50% of the Tracks.<br>• Playlists that the customer has in their library.<br>• Playlists that the customer has rated as Hate it!<br><br>Additionally the system will seek to return the best correlated two new Customers that are one-week old new releases in the system, replacing the least highly |
| Inbox – editorial and promotional. | Inbox items are directed to the customer based on what they listen to. An extension of this would be to supply news on Artists that we THINK they may be interested in based upon our Artists correlations matrix. | Artist Associations Matrix | As per "Artists "You might like". | As per "Artists "You might like". |

*in all cases, if no recommendations are available (e.g. all correlations are zero), then simply return the most popular entities (but conforming to the post-filters like not including Hate-it! Material.

COMPUTER IMPLEMENTED METHOD FOR AUTOMATICALLY GENERATING RECOMMENDATIONS FOR DIGITAL MEDIA CONTENT

CROSS REFERENCE TO RELATED APPLICATIONS

This application claims the priority of PCT/GB2010/051113, filed on Jul. 6, 2010, which claims priority to Great Britain Application No. 0911651.8, filed Jul. 6, 2009, and Great Britain Application No. 0921542.7, filed Dec. 9, 2009, the entire contents of which are hereby incorporated in total by reference.

BACKGROUND OF THE INVENTION

1. Field of the Invention

This invention relates to a computer implemented method for automatically generating recommendations for digital media content.

2. Technical Background

A recurring issue with regard to media content is that of locating new content. Specifically, finding new music, books, video and games which complement or enhance one's existing taste in such media content without being so close as to be dull nor so far from one's existing taste as to be unpalatable.

Historically, the major solution to this problem has rested with a combination of word of mouth, marketing exercises and the significant body of genre-related review magazines, and latterly websites.

As access to media content has expanded, however, these historical solutions have been proving less and less useful to the consumer.

What is needed, and which is provided by the present invention, is some mechanism for analysing the consumer's existing tastes and using the results of that analysis to identify both media content which is likely to appeal to that individual and also like-minded individuals who share some or all of that individual's taste in media content.

SUMMARY OF THE INVENTION

The present invention discloses a mechanism whereby the media content (e.g. "music listening") preferences of an individual may be analysed and used to provide recommendations to that individual of other media content which that individual is likely to also enjoy, together with identifying other individuals who share similar tastes.

The computer implemented process disclosed by the present invention may, in one implementation, be viewed as encompassing the following steps:
  Identify the user's current media content library/ies
  Analyse the content of those libraries, deriving a "taste signature" for the user from that analysis
  Match the derived "taste signature" to other media content and to other users and provide the user with recommendations based on that automatic matching process.

Specifically, the method automatically generates recommendations for digital media content for a first user by (a) analysing digital media and its associated metadata for media that is used by a first user and (b) using that analysis to provide, for that first user, recommendations of both additional digital media content and also recommendations of other users with similar preferences to that first user.

The method may include the steps of analysing digital media and associated metadata that is used by other users and then identifying those other users with preferences that are similar to the first user; and in which the recommendations for the first user are based on analysing the digital media and associated metadata that are used by those other users with preferences that are similar to the first user.

In an implementation:
  the recommendations of other users include one or more of: the names of those other users, playlists of those other users, currently being played by those other users, personal favourites or other recommendations of those other users.
  The method may involve locating and identifying existing digital media used by a first user, prior to analysing that digital media.
  For example, the existing digital media used by a first user can be located by a computer implemented process of searching for digital media files on one or more of: (a) device(s) used by the first user, including but not limited to one or more of computers, mobile devices, media players and games consoles; (b) online storage facilities accessed by the first user; (c) physical storage media, including but not limited to Compact Discs (CDs) and Digital Video Disks (DVDs); (d) digital media content played by the first user on media players on his said device(s).
  The digital media may be identified by one or more of: (a) analysing a file name; (b) examining digital tags stored in the file, including but not limited to explicitly embedded tags, such as ID3 tags used in MP3 files; (c) examining associative tags, such as album artwork associated image files used by media players; (d) examining metadata stored in a media player's database, including but not limited to the genre classification of a track; (e) reading metadata associated with physical media, such as CDText data and/or serial numbers on a storage medium such as a Compact Disc or any other storage medium. The digital media may also be identified by processing a file using a Digital Signal Processing (DSP) algorithm and comparing the signature so produced to a database of such signatures.
  The associated metadata may be obtained by locating the identified digital media item within a database of such metadata. The associated metadata may include:
    metadata obtained by processing the file using a Digital Signal Processing (DSP) algorithm to extract one or more of (a) the mood, tempo and/or beat of a piece of music; (b) the language(s) used within a given piece of digital media content; (c) and other metadata which may be obtained using the said DSP algorithm(s).
    playback metrics for the digital media file, the playback metrics being obtained by one or more of (a) examining playback metrics recorded by media players on the user's device; (b) examining file access metadata recorded by the operating system on the user's device, including but not limited to the "last access date" of NTFS file systems; (c) recording playbacks of media items as digital media items are played by the said user on the said device.
    ratings assigned to digital media items and/or groups of digital media items. The ratings may be assigned by one or more of (a) users of a digital media service; (b) any other individuals, including but not limited to employees of a digital media service; (c) analysis of metadata associated with digital media items, including but not limited to databases indicating relationships between digital media items and/or groups of digital media items such as artists, authors and/or albums.
    records of the interaction between the first user and the digital media items available to the first user's device(s).

the demographics of the first user.

records of the interaction between the other users of a digital media service and digital media items available to the other users and their device(s), where an association is noted between the first user and the other users based on one or more of their demographics; their device type(s); their locale or any other available metadata.

The metadata may be analysed by creating a matrix describing the first user's interactions with the digital media, including some group of digital media including but not limited to artists, authors, albums or any other grouping. The metadata may be analysed by creating a matrix that captures the correlation between the first user's interactions with the digital media and other users' interaction with the digital media that they use. The matrix may be weighted such that those interactions which are most relevant to the process of generating recommendations are given a proportionally higher weighting in the matrix by using a frequency analysis algorithm, by adjusting weightings according to the playback metadata or by any other method such that either a higher or a lower value is indicative of a correlation between two items in the matrix. The matrix may also be normalised.

The recommendations of digital media items, of users and/or of groups of digital media items can be obtained by locating correlating values in the said matrix.

the analysis performed by any other recommendation algorithm.

The first user may also be a group consisting of more than one individual user.

A second aspect is a computer based system adapted to perform the method defined above. It comprises a computer implemented system for automatically generating recommendations for digital media content, in which the system is adapted to (a) analyse the digital media and its associated metadata and (b) use that analysis to provide, for that first user, recommendations of both additional digital media content and also recommendations of other users with similar preferences.

BRIEF DESCRIPTIONS OF THE FIGURES

FIG. 1 presents a sample matrix of track plays for use in calculating the digital media preferences of users.

FIG. 2 presents a sample matrix of track plays weighted by relevance using the TF·IDF formula.

Figure 3:
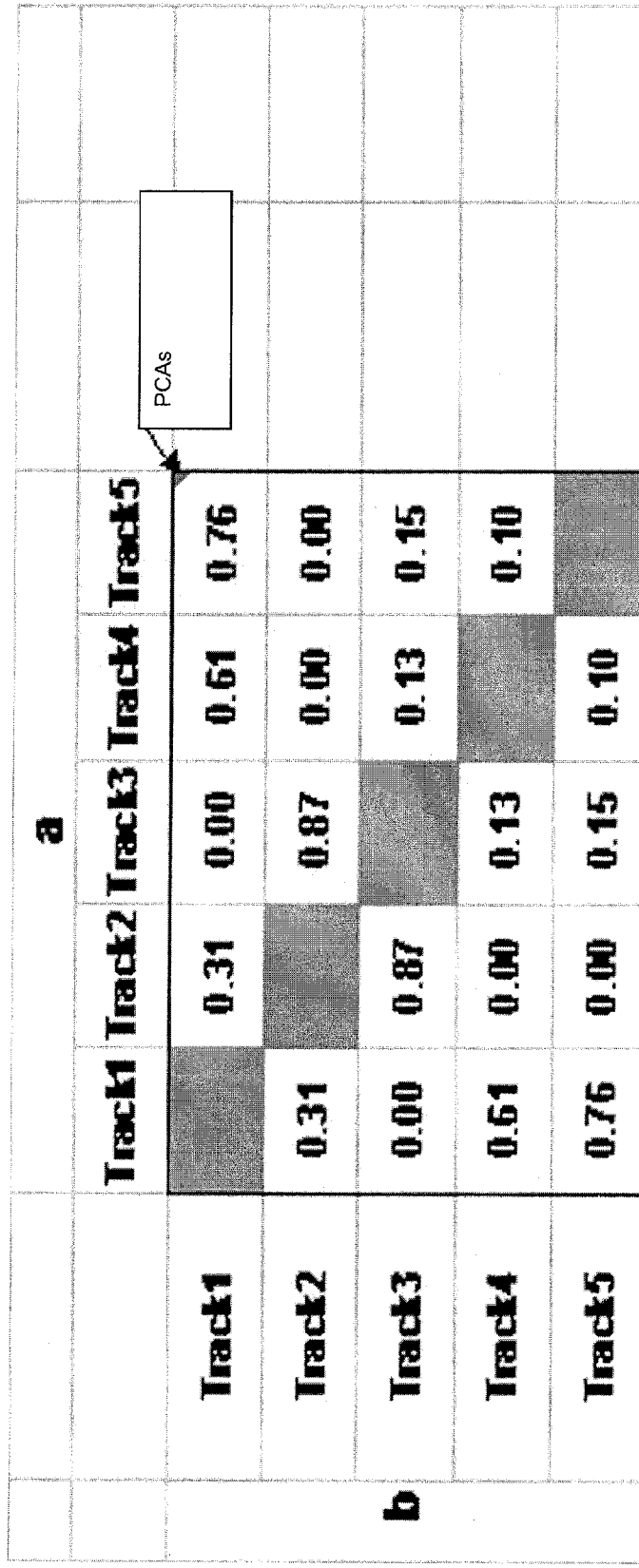

FIG. 3 presents a normalised sample matrix of track plays, adjusted such that values range from 0 to 1.

Figure 4:
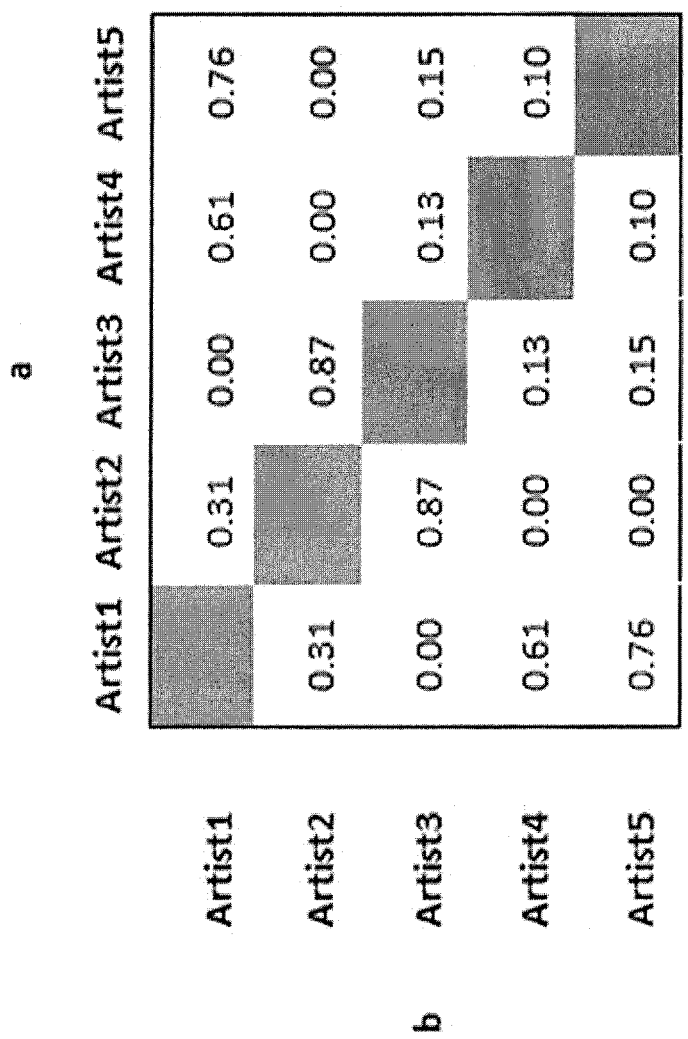

FIG. 4 presents an Associated Artists Matrix, which is a matrix of correlations representing how strongly associated pairs of Artists are in the system, based on ratings, and customer plays.

Figure 5:
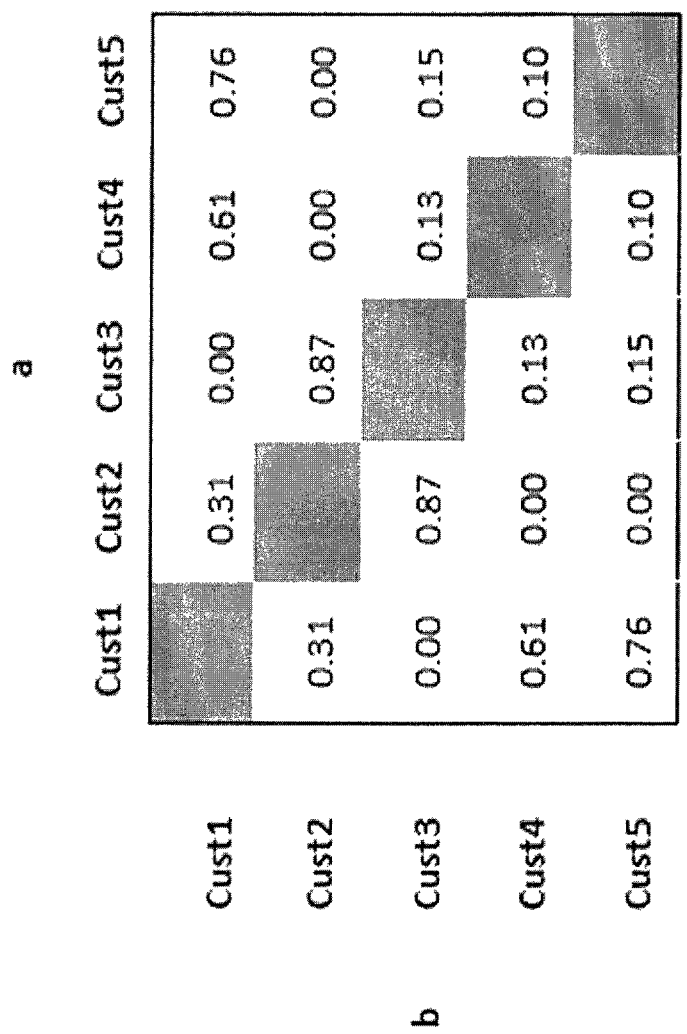

FIG. 5 presents an Associated Customers Matrix, which is a matrix of correlations representing how strongly associated pairs of Customers are in the system, based on ratings, and customer plays.

FIGS. 6a-6d are a table that summarises the recommendations functionality, describing the functionality, the associated matrix, the inputs to the recommendation process and the results mechanism.

DETAILED DESCRIPTION

Definitions

For convenience, and to avoid needless repetition, the terms "music" and "media content" in this document are to be taken to encompass all "media content" which is in digital form or which it is possible to convert to digital form— including but not limited to books, magazines, newspapers and other periodicals, video in the form of digital video, motion pictures, television shows (as series, as seasons and as individual episodes), images (photographic or otherwise), music, computer games and other interactive media.

Similarly, the term "track" indicates a specific item of media content, whether that be a song, a television show, an eBook or portion thereof, a computer game or any other discreet item of media content.

The terms "playlist" and "album" are used interchangeably to indicate collections of "tracks" which have been conjoined together such that they may be treated as a single entity for the purposes of analysis or recommendation.

The verb "to listen" is to be taken as encompassing any interaction between a human and media content, whether that be listening to audio content, watching video or image content, reading books or other textual content, playing a computer game, interacting with interactive media content or some combination of such activities.

The terms "user", "consumer", "end user" and "individual" are used interchangeably to refer to the person, or group of people, whose media content "listening" preferences are analysed and for whom recommendations are made.

The term "taste" is used to refer to a user's media content "listening" preferences. A user's "taste signature" is a computer-readable description of a user's taste, as derived during the process disclosed for the present invention.

The term "recommendations" refers to media content items ("tracks", "playlists" and "albums"), and/or other users of the service within which the present invention is utilised, which are identified, using the mechanisms disclosed for the present invention, as matching or complementing the user's taste in media content. In the case where a "recommendation" refers to another user of the service who has similar tastes to this user then the alternative term "nearest neighbour" may be employed.

The term "device" refers to any computational device which is capable of playing digital media content, including but not limited to MP3 players, television sets, home computer system, mobile computing devices, games consoles, handheld games consoles, vehicular-based media players or any other applicable device.

Overview

The present invention discloses a mechanism whereby the media content (e.g. "music listening") preferences of an individual may be analysed and used to provide recommendations to that individual of other media content which that individual is likely to also enjoy, together with identifying other individuals who share similar tastes.

The process disclosed by the present invention may be viewed as encompassing the following steps:

Identify the user's current media content library/ies

Analyse the content of those libraries, deriving a "taste signature" for the user from that analysis Match the derived "taste signature" to other media content and/or to other users and provide the user with recommendations based on that matching process Each stage of the process is described in turn in the sections which follow.

A. Identify and Analyse the User's Media Content

Locate Media Content

Users are able to store media content in a variety of locations, some of which may be immediately accessible but others are less so. In order to ensure that an analysis of a user's taste is as useful as possible, such an analysis must be as comprehensive as possible, including as much of that user's media content as it is practical to access.

To meet that "comprehensive" standard, the content of the user's device must be examined to search for media content, looking in all common storage locations, including but not limited to one or more of the following:

File system locations, such as the "My Music"/"Music", "My Video"/"Video" folders in Microsoft Windows. Users may also be prompted to identify any other of their media files to be included in this analysis.

Media player local databases for all identifiable media players which are installed on the device, such as iTunes, Windows Media Player, RealPlayer, VLC Player, DivX Player and so forth. For those players which maintain a database of media files, that database may be queried; for those player which maintain a "recently used files" list, that list may be inspected.

Online media stores. Users are able to store media content online, whether explicitly by storing actual files or indirectly by storing metadata describing files or by some combination of the two. Users may be prompted to identify and provide access to such online stores as they wish to include in the analysis, such as myspace, last.fm, flickr, facebook, spotify, amazon or any other online facility which permits the store or description of media content by end users.

Physical media, such as media content stored on CDs, DVDs or other storage media owned or used by the user, may be examined as to their contents.

When performing this "device sweep" it is important to exclude from the analysis any standard "preview" media content which is included with a device or media player, since such content is not indicative of the specific user's taste.

Gather Metadata

The purpose of the "device sweep" is to gather information about the user's existing media content and their listening preferences with respect to that media content. For that reason, the sweep needs to accumulate a considerable body of metadata concerning the media content files found. Such metadata may take several forms, including but not limited to one or more of the following:

Tags on media files, including explicitly embedded tags, such as ID3 tags used in MP3 files; associative tags, such as album artwork associated image files used by media players such as iTunes; and metadata stored in a media player's database, such as the genre classification of a track.

Physical media, such as media content stored on CDs, DVDs or other storage media owned or used by the user, may be examined as to their contents. For example, in one embodiment a user may be permitted to make an audio CD available to software which implements the present invention, whereupon the said CD could be read, along with any CDText data, and its identifying signature matched against a database of such signatures in order to identify the track listing and associated metadata for that CD.

Playback metrics, where available. Some media players, such as iTunes and Windows Media Player, are capable of storing details of when, how often and for how long individual media content files have been played. In addition, some file systems provide clues to playback metrics—for example, by default NTSF stores a "last access time" against files which may be used as an indicator as to when a particular track was last played by the user.

DSP ("Digital Signal Processing") techniques may be applied to media content in some instances, permitting the extraction of additional metadata about individual tracks. For example, if the device capabilities permit then DSP processing of audio files may be applied to provide details such as the mood, tempo and beat of a piece of music.

Track identification technology, such as TrackID or some other media content signature generation technology, may be applied to each track to generate a digital "signature" which can then be matched against a database of such signatures in order to identify the specific track, as a cross-check of other metadata and/or as a method of identifying tracks for which incomplete, corrupt or no metadata is located.

One major purpose of performing this sweep is to identify the media content on the user's device. The metadata for each track may also, in the preferred embodiment, be enriched by reference to a more comprehensive database against which metadata may be matched and additional information about each track retrieved.

As a result of the "device sweep", a detailed description of the user's available media content has been constructed. That description may include such "metadata" items as the title, artists, duration, release name, beat, tempo, mood signature, playback metrics such as the time the track was last played by the user, associated artwork, ratings of the track by this user and/or any other information which may be available for analysis.

In addition, there may be media content items ("tracks") which could not be identified automatically during the "device sweep" phase. Such items may, in an example embodiment, be referred to the user for later definitive identification. In another example embodiment, such unidentified items may be tagged by the system for further analysis at a later point.

Where this user has previously registered a device with the service provided using the present invention then metadata may also have been obtained from the user's previously-registered device(s). In which case that previously-stored metadata is also, in the preferred embodiment, consolidated with the data obtained from the "device sweep" and the resultant collection of data used for analysis.

Linked Friends Weighting

In one example embodiment then, where a user has linked himself to one or more other users of a media content provision service within which the present invention is being utilised (i.e. the user has "linked friends" on that service) then the user's own metadata package may be augmented by those of his linked friends, suitably weighted to ensure that any recommendations made are primarily based upon this user's own media rather than that of his linked friends.

In the preferred embodiment, the weighting given to a user's linked friends' media content is configurable according to the type of linked friend.

For example, supposing that this user belongs to a service in which he has n other individuals linked as "close friends" and m linked as "linked friends" (counting only those linked friends for whom metadata is available within that service), where the "close friends" weighting is configured to N % and the "linked friends" weighting to M %. In such a case, the preferred embodiment would, when making recommendations, consolidate the linked friends' metadata to the user's such that the weight given to the user's metadata is (100−N−M)%, the weighting given to each "close friend" is (N/n)% and that to each "linked friend" (M/m)%. Where n or m are zero, the relevant component (N or M respectively) is omitted. Thus, a user with no close or linked friends would have his recommendations entirely based upon his own available media content.

Demographics as Metadata

The device type may also be used, in the preferred embodiment, as a source of metadata, as may other information such as the location of the user (to whatever granularity is available, from the user's country to their precise location as obtained via GPS or some measure in between the two, such as IP address analysis. Similarly, "device" may refer to a specific device or to a class of devices of a defined type, such as "portable game consoles" or "devices which can play DivX video" or "Games Console Model PQT-4381v2.12" or "devices which incorporate a BluRay player").

Such information may be used to provide a demographic profile of purchasers/users of specific devices and/or inhabitants of given locales. To take a trivial example, such information would be used in one example embodiment to tend to recommend Spanish-language tracks or tracks which are popular in Spain to those users who are based in that country.

In addition, demographic information can, in the preferred embodiment, be obtained from a recommendations database which stores analyses of the musical preferences of all users of the service organised according to device type and/or location.

Device-specific metadata stored in the preferred embodiment includes information as to which tracks are most popular amongst users of a particular device in a particular region, with cross-references relating the demographics of average users of such devices to the popularity of tracks of users with such demographics (for example, where the average user of a particular device in the UK is determined to be an 18-25 year old male then the default tracks recommended for a user of that device, where no more specific information is available from a device sweep, would be those tracks which are generally popular on the service amongst 18-25 year old males in the UK).

The tastes of users within this user's own demographic group—as explicitly provided by the user and/or identified via the mechanisms outlined above—may, in the preferred embodiment, be used to augment recommendations made to this user using the same mechanism, mutatis mutandis, as disclosed in "Linked friends weighting" above.

B. User-Device Interaction

In addition to analysing the user's music collection, in the preferred embodiment the present invention also analyses the way in which the user interacts with that device, in terms of the specific user under consideration and/or in terms of the average user of such a device.

Elements considered include one or more of the following:

Which areas of the device's user interface the user utilises most often. For example, in the user interface for some device types the service within which the present invention is utilised may categorise media content into separate "channels" based on file format (such as DRM status), media type (video, music, fiction, books, scientific papers and so forth), metadata considerations (such as mood, era, genre and so forth). In such a circumstance, the user's preference for particular "channels" may be used to weight recommendations for new media content. Where such channels are themselves grouped into "meta channels" then the preferred embodiment would treat the said meta channels similarly.

In the case of a user who has previously registered and interacted with tracks (or "channels", as disclosed above) on other device(s) then the user's interactions with media content on those other devices may be used as additional metadata to weight recommendations for the current device.

The demographics of the "typical" user of that device type (i.e. of that specific device or of the class of devices of which it forms a part) may also be taken into account, as disclosed earlier in "Demographics as Metadata"

The present invention also takes account, in its preferred embodiment, of the capabilities of the device. Elements considered include one or more of the following:

Where a given track is located in different parts of the user interface of the device simultaneously (for example, if the said track appears in multiple channels within the device's user interface) then, in the preferred embodiment, that track may be weighted for recommendation purposes in order to ensure that the device's user interface is populated as rapidly as possible.

Available bandwidth. The bandwidth available to a device is a consideration when determining the size of files which may be provisioned to that device, and hence may be used to weight recommendations in favour of smaller files (whether in terms of shorter lengths or more efficient encoding techniques which are more appropriate for a given device) where necessary Periodic Updates and Playback Metrics In the preferred embodiment, the user's device is re-swept to locate new or updated media content and/or metadata at regular intervals which, in the preferred embodiment, are of configurable duration. Any changes detected are then used to provide more relevant updates.

Where the present invention is utilised within a service which permits user ratings and/or playback metrics to be recorded and communicated then such metrics are, in the preferred embodiment, used to update the recommendations provided to the user, such that future recommendations take account of the user's specific preferences.

Other Contributing Factors

In addition to the "device sweep", demographic analysis, contributions from linked friends' taste metrics and the ongoing analysis of a user's playback metrics while using the service within which the present invention is utilised, sundry additional factors may also be utilised, in the preferred embodiment, to influence recommendations given to the user.

In the preferred embodiment, such factors include, but are not limited to:

The content of free text fields provided by the user, such as taglines and the titles given to user-created playlists within the service Media content recommendations sent by this user to his linked friends Media content recommendations received by this user from his linked friends and listened to, in whole or in part Tracks marked as "favourites" or rated in some fashion by this user Associated tracks within a pre-existing database. Where the service within which the present invention is being utilised has access to a database containing media content metadata then that metadata may be used, directly or indirectly, to feed into the recommendations process by providing associations between tracks.

Externally identified associations. In one embodiment an automated or manual analysis of articles, online or otherwise, about multimedia content may indicate a strong correlation between two or more artists, tracks or other related metadata. Such correlations may similarly feed into the recommendations process.

Such considerations, and any others which are applicable, may be used, in the preferred embodiment, to increase or decrease the weightings given to individual tracks when performing the analysis to locate tracks and "nearest neighbours" (users who share the same taste as this user) to recommend to this user.

Group Considerations

Up to this point, the disclosure of the present invention has been concerned with individual users rather than groups of users. When considering groups, the preferred embodiment consolidates the metadata of individuals within each group into a single collection of metadata and makes use of that combined metadata for analysis and recommendation purposes.

That consolidation, in the preferred embodiment, is performed in two stages:

Identify the frequency with which tracks are seen within the group (i.e. in a group of 5 individuals which tracks appear in the libraries of all 5 individuals, which in 4, which in 3, and so forth).

Weight each track's contribution to the overall group taste signature according to that identified frequency, such that the more commonly shared tracks within the group contribute a greater weight to the recommendations given to that group.

In the case of group recommendations, the linked friends of individual group members do not contribute to the overall weighting of tracks for the purposes of making recommendations of media content or of individuals with shared tastes in media.

Empty Devices

In some instances, such as on first use, it may not be possible to perform a device sweep of a user's media files.

For example, this may occur where there are no identifiable media files on the device and this user has not previously registered a device with the service within which the present invention is being utilised and the user has no linked friends within that service (or no such registered devices or linked friends can be identified due to, for example, a poor quality or absent network connection).

In such a case, recommendations may still be made based on demographic metadata alone, as disclosed above in "Demographics as Metadata".

In the preferred embodiment, such "blank device profiles" are regularly pre-calculated for appropriate locales (such as countries or regions within a country or whatever other granularity is required) to assist with loading recommendations for new blank devices of that type.

C. Make Recommendations

Once the user's media content has been located and identified, as disclosed above, his affinity for specific tracks, artists and playlists may be calculated using the techniques disclosed in detail below, whereby this user's predilections for specific tracks and artists is stored in a database as a "taste signature" for that customer, along with similarly-calculated preferences from other users.

The analysis detailed below may then be employed to locate a "neighbourhood" of users who share similar preferences—that is, whose "taste signatures" are similar to this user's taste signature.

Recommendations of "nearest neighbours" for this user are then drawn from the pool of users within that defined "neighbourhood".

Media contents recommendations—such as tracks, artists, albums, releases or playlists—are then made on the basis of the popularity of that class of item within the "neighbourhood" pool identified.

Recommendations & Ratings

Introduction

This section describes a method for running and hosting a recommendations system for a digital media service.

The worked examples presented in this section refer to simple plays of tracks, since that particular case may be employed in one example embodiment, and the use of that metadata to provide recommendations. However, this case is presented for simplicity only and must not be considered the limit of the technique disclosed: The metadata on which recommendations are produced in actuality is that disclosed in the main body of this document, not merely simple track plays.

It is important to note that, when not explicitly stated otherwise, a full-play uses the same criteria as that used for subscription licensing with the content owners. In one sample embodiment this represents a play of either a certain minimum number of seconds of a track or percentage of a track.

A. Recommendations

Supporting systems are required to support the following personalised customer recommendations:

"More like this" Track, Album or Artist
Tracks "You might like"
Albums "You might like"
Artists "You might like"
Playlists "You might like"
"Recommended Members" as listed on the Buzz Cool Members screen
Recommended Playlists as listed on the Buzz Cool Playlists screen—is this the same list as Playlists you might like?
"Find in Playlists?"
Inbox—editorial and promotional B. Supporting Logical Structures for Making Recommendations We have three main structures to support the making of these recommendations.

Associated Tracks Matrix
Associated Artists Matrix
Associated Customers Matrix

We will discuss the physical infrastructure of systems in a later section. For the moment, it is sufficient to consider that these structures will be frequently refreshed, in the preferred embodiment every 24 hours.

Supporting Structure 1—Associated Tracks Matrix

The Associated Tracks Matrix is a matrix of correlations representing how strongly associated pairs of Tracks are in the system, based on ratings, and customer plays.

Stage 1—Produce Counts of Track Associations

For Tracks we build a matrix representing counts of customers who have either/or fully played, or have rated as Love It!, the Tracks in the pair, as illustrated in FIG. 1.

Important Notes and Rules

The matrix above only considers a universe of 5 Tracks. In a real-world implementation of this technique, millions of tracks may be involved in these calculations.

In order to be included as a count in FIG. 1, the user in question must have listened fully (as defined by the licensing agreements) AT LEAST TWICE. The rationale behind this is that, if a customer listens to a Track more than once, then they probably like it. If they only listen to the Track once then they may only be exploring new music, but not be impressed enough to ever go back to it.

If a customer rates two Track pairs highly, and listens to both more that twice, then this will have the effect of adding 2 to the corresponding intercept in the matrix. This is the maximum influence that one user can ever have on a Track intercept pair.

A Track that has been rated as Love It!, but never played, still counts towards an association.

This matrix covers all Tracks, and all ratings and plays, across all services, within the global MusicStation offering. The same applies to the Artists Associations Matrix described further on.

You will note that half the matrix is duplicated across the diagonal. Therefore only half of the matrix needs to be calculated, and in the preferred embodiment only that unique half of the matrix is calculated.

Stage 2—Weight the Track Associations

We now need to take the matrix from Stage 1 and apply weightings and produce correlations that take account of the fact that some Tracks might just simply be popular to ALL customers (and hence are not necessarily highly correlated for individual associated pairs).

The formula that we apply to do this is known as a TF·IDF formula.

A description of how the TF·IDF formula works, in the context of keywords belonging to a document or web search, is outlined here for information purposes only:

TF=Term Frequency

A measure of how often a term is found in a collection of documents. TF is combined with inverse document frequency (IDF) as a means of determining which documents are most relevant to a query. TF is sometimes also used to measure how often a word appears in a specific document.

IDF=inverse document frequency

A measure of how rare a term is in a collection, calculated by total collection size divided by the number of documents containing the term. Very common terms ("the", "and" etc.) will have a very low IDF and are therefore often excluded from search results. These low IDF words are commonly referred to as "stop words".

$$\text{Weighting} = \text{frequency} \times \log_2\left(\frac{1}{p(T_1)p(T_2)}\right)^3$$

Notes on this equation:

The TF=frequency (or the intercept value in the Stage 1 matrix).

The IDF is represented by the latter (log) part of the equation, and is a base-2 logarithm.

$P(T_1)$ represents the overall probability of Track 1 appearing at least once in the different pairings in the matrix (i.e. it is simply how many times it occurs at least once in a pairing, divided by the total number of Tracks).

The IDF is raised to the power of 3. This is not a fixed constant, but is something that can be experimented with in order to refine the recommendations.

As an example of the equation's use, if we wish to calculate a weighting for Track 1 and Track 2 from the Stage 1 matrix, then we would perform the following calculation $$\text{Weighting}(T_1, T_2) = 12 \times \log_2\left(\frac{1}{\frac{3}{4} \times \frac{2}{4}}\right)^3$$

This gives a weighting for Track 1 and Track 2 of 34. We can now produce a new Weightings Matrix, including the sum of all the weightings at the end of each row and column, as illustrated in FIG. 2.

Stage 3—Normalize the Weightings

We now need to normalize the weightings. Essentially all this means is that we create a new matrix where every weighted correlation in the matrix is divided by the overall sum for the correlations in that row or column.

Using the example of Track 1 and Track 2 again, we would simply divide 34 by 110.5, providing a normalised weighting of 0.31.

The result of this is that we now have a set of normalized weightings lying between 0 and 1, as illustrated in FIG. 3.

In the resulting table, the nearer the value is to 1, then the higher the correlation between the Tracks.

In the world of recommendations, the values in the table are now called Pre-Computed Associations (PCAs), by virtue of the fact that they are correlations, at that they are reproduced on a regular basis (but generally not updated in an ongoing manner due to the amount of number crunching involved).

Supporting Structure 2—Associated Artists Matrix

The Associated Artists Matrix is a matrix of correlations representing how strongly associated pairs of Artists are in the system, based on ratings, and customer plays. A sample matrix is illustrated in FIG. 4.

The Associated Artists Matrix of PCAs will essentially be built in exactly the same way as that for Tracks.

The criteria for inclusion in the Artist Plays Matrix is that the customer must have fully played at least one track from that Artist at least twice. Again, the maximum influence a single customer can have on the matrix is a an additional value of 2 (in the instance where they have both rated a pair of Artists as Love It! And have fully listened to at least one Track from both Artists at least twice.

Supporting Structure 3—Associated Customers Matrix

The Associated Customers Matrix is a matrix of correlations representing how strongly associated pairs of Customers are in the system, based on ratings, and customer plays.

The Associated Customers Matrix of PCAs can be built as part of the same process for generating the Associated Artists matrix, and an example of such a matrix is illustrated in FIG. 5.

The criteria for inclusion in the Associated Customers Matrix is that the customer must have fully played at least one track from the same Artist* at least twice. Again, the maximum influence a single customer can have on the matrix is a an additional value of 2 (in the instance where they have both rated THE SAME pair of Artists as Love It!, and have fully listened to at least one Track from both Artists at least twice.

N.B. Choosing common Artists here is likely to be beneficial over choosing common Tracks since the implications for calculations and processing power will be lowered. Consequently, this approach is the one taken in the preferred embodiment of the invention.

C. Making Recommendations

This section describes how the described structures are used to generate recommendations, in one example embodiment, for:

"More like this" Track, Album or Artist

Tracks "You might like"

Albums "You might like"

Artists "You might like"

Playlists "You might like"

"Recommended Members" as listed on the Buzz Cool Members screen

Recommended Playlists as listed on the Buzz Cool Playlists screen—is this the same list as Playlists you might like?

"Find in Playlists?"

Inbox—editorial and promotional

All the functionality described runs at run-time on a per-request basis, based upon the calculated PCAs. We are not calculating recommendations for all customers. We only produce them when requested from the PCAs. FIGS. 6a-6d are a table that summarises the recommendations functionality, describing the functionality, the associated matrix, the inputs to the recommendation process and the results mechanism.

D. Supporting Infrastructure for Recommendations

Since the Track PCA matrix will be by far the biggest (remember the Customer Associations Matrix is on a per-service level, and likely to be spread across different servers), we can take the Track Associations Matrix as an example we can get an idea of the amount of storage required to accommodate our PCA structures.

Assuming that we have 500,000 Tracks, and are using a 16-bit 4-decimal place floating-point representation for each PCA (could be 10-bit id the underlying stack allows this), then the total number of PCAs required to store is:

$$5 \times 10^5 \times 5 \times 10^5 = 25 \times 10^{10} \text{ correlations.}$$

However, since the matrix is duplicated across the diagonal, we can halve this giving:

$$12.5 \times 10^{10} \text{ correlations.}$$

Since each PCA takes 2 bytes to store then the total memory required is:

$$2 \times 12.5 \times 10^{10} = 25 \times 10^{10} \text{ bytes.}$$

(More decimal places may be required since some of these correlations could be < >0 but still very small).

Or approximately 240 GB.

Notes

If an 8-bit floating-point representation was used then we could halve the memory requirement (though we would loose accuracy)

With a million Tracks the implication for storage is almost up to 1 Terabyte.

Refer to section 0 for more discussion on how space can be saved.

Architecture

The following is recommended as a minimum to manage implementation of the preferred embodiment:

PCA generation server. Creates and stores the PCA matrices. Is effectively a dumb, but powerful server, with plenty of disk capacity.

Recommendation broker. Requests and responds to recommendation requests. Contains the intelligence to build the recommendation set based on the PCA tables on the PCA server. The PCA matrices could sit on this server once created, or alternatively be located on another server.

Update Frequency

Two recommended approaches, either:

1) The PCA matrices be totally re-generated from raw-data every 24 hours, or
2) The Stage 1 matrices are maintained and updated in real-time, and blown into the PCA matrices at regular intervals.

Approach 2) may take less time and be more efficient, though it does rely on the Stage 1 data always being accurately maintained.

Storage

The PCA matrices may be stored in a database of whatever structure, whether a relational database, a flat-file format or some other approach to data storage. Whatever physical storage mechanism is used, the likely structure will be:

| Track1_ID | Track2_ID | PCA |
|---|---|---|
| 12345 | 12346 | 0.0023 |
| 12345 | 12347 | 0.2040 |
| 12345 | 12348 | 0.0002 |
| 12345 | 12349 | 0.0001 |

IMPORTANT: In the preferred embodiment, storage space may be saved by not storing PCAs that are equal to 0. Basically, if there is no association of two Tracks in the table, then the PCA will be assumed to be 0.

Caching

Consideration should be given as to cache intelligently—for example; MyStrands find that just keeping the top 250,000 most-recently-used PCAs in memory still provides a 93% hit-rate from customer requests.

E. Solving Cold Start Issue

At initial go-live we will have no usage or rating date with which to compute PCAs. This section seeks to address this issue.

Incorporating Initial Data

Third party databases can supply information linking related Artists as well as Sub-Genre information for many Tracks.

In the preferred embodiment, the cold-start issue is solved by creating an initial set of PCA matrices in which we have placed associations based on that initial data, as illustrated by the examples below:

For example, for the Artist Associations Matrix, we can simply insert an initial starter-value of 10 into the Stage 1 creation process for all Artists that are related according to the initial data, and a value of 5 if they share the same Sub-genre.

Similarly for the Track Associations Matrix, we can simply insert an initial starter-value of 10 into the Stage 1 creation process for all Tracks by Artists that are related according to the initial data, and a value of 5 if they share the same Sub-genre.

For the Customer Associations Matrix, we can simply insert an initial starter-value of 10 into the Stage 1 creation process for all Tracks by Artists that are related according to the initial data, and a value of 5 if they share the same Sub-genre.

How to Present Recommendations on First Use

When a customer first uses a music service which employs the preferred embodiment of the recommendations engine disclosed by the present invention, there will be no usage or rating data available for that customer to base recommendations on. There are two options to address this:

1) Display a message to the customer in the "You might like" sections explaining something like "Once you have listened to or rated some music, we will recommend other Artists/Albums/Tacks/Playlists/Members that you might like."
2) Because, the system always returns the most popular entities as defaults when no other customer input data is available (refer to the starred comment after the table in section 0), the system will simply return the 10 most popular entities (i.e. Tracks/Artists/Albums etc,).

If we decide to go with 2) then we would need to ensure that we have set up some initial popularity data in the database so that the very first users of the service receive some recommendations.

The preferred embodiment is to use the approach in 1), since:
1) First impressions last, and customers might be put off when being presented with recommendations that are blatantly of the mark.
b 2) It is a good introduction to the customer on how the "You might like" sections work.

F. Optional Components

The following are additional considerations, one or more of which may be added to the disclosed procedure in any example embodiment of the present invention.

Randomizing Output to Allow for Refresh of Recommendations

If we randomized the output of the recommendations system somewhat, then we could allow for the customer to request a new set of "You might like" recommendations.

For example, the recommendation system internally could actually return 100 entities, of which 10 are randomly chosen for return back to the client.

Keeping Recommendations Current

In order to keep recommendations current (i.e so that they shift over time with customers' tastes), it would be a good idea to keep 2 sets of PCA matrices being updated concurrently, with the second set of matrices being, for example, staggered 1 month behind the first in terms of the data used. At a certain point (say once a month) the reserve matrix could be switched into 'live', ensuring that fresh associations are available based on current trends. At the same time we would begin calculating PCAs for a new reserve table.

Filtering Recommendations

It would be useful if recommendations could be post-filtered by Era, Genre, Rating and Mood (if available) or by any other criteria.

Moods

It would be a god idea to allow customers, or editorial personnel, to associate Artists, Albums, Tracks or Playlists with a pre-defined set of moods. These moods could then be used as the basis for making recommendations (e.g. show me Happy music that I might like), and for post-filtering the results (as described in the previous section. This functionality would be a good v1 for Tags.

Supporting Structure 4—Associated Web-Artists Matrix

A duplicate structure as that described for the Associated Artists Matrix in FIG. 4 ("Associated Web-Artists Matrix") could be built from information crawled from the Internet.

Whenever 2 Artists are found on the same page, then we could assume that this is a positive association.

Similar mechanisms may be employed to incorporate other associations disclosed by the present invention.

Explaining Recommendations

Customers like to gain an understanding of how recommendations have been created for them. For this reason we could have a menu option similar to "How did I get these?"

G. Generating Starred Ratings

This section explains how we generate the 5-star ratings for Artists/Albums/Tracks/Playlists.

Inputs to the Rating System

In the preferred embodiment, there are two inputs to the star-ratings system—explicit ratings (i.e. Love It! and Hate it!), and implicit ratings (i.e. number of listens to Artists/Albums/Tracks, specifically the number of times a customer has fully-listened to that Artist/Album or Track, and at least twice).

It is recommended that, where possible, the ratings be mad up of a 50/50 split of explicit and implicit measures. This will also have the advantage that customers cannot simply abusively rate stuff to get it to appear with a higher or lower star rating.

Calculating the 5-Star Rating for Artists, Albums, Tracks and Playlists

Calculating the Explicit Rating Value

The explicit rating for an Artist/Album/Track/Playlist is simply based upon the proportions of customers who rated the Artist/Album/Track as Love It! against those who rated it as Hate It!. It is calculated as follows:
1. Take the number of customers who have rated the Artist/Album/Track/Playlist as Love It!.
2. Divide the value in (1) by the overall number of customers who have rated the Artist/Album/Track/Playlist (i.e. either as Love It! or Hate It!)
3. Multiply by 5 to provide a rating value out of 5.

For example, consider that for Angels—Robbie Williams, we have 45 Love It! ratings and 18 Hate It! ratings. The rating value is then:

$$\text{Rating\_value} = \left(\frac{45}{45+18}\right) \times 5 = 3.57$$

Adjusting the Rating Value to Handle Low Number of Ratings

I order to avoid abuse, and to prevent lots of 0 or 5 star ratings appearing in the system in situations where only a few customers have rated an Artist/Album/Track/Playlist, we should always include two phantom ratings of Love it! and HateIt! in the calculation. Thus the final calculation becomes:

$$\text{Rating\_value} = \left(\frac{45+1}{(45+1)+(18+1)}\right) \times 5 = 3.53$$

Calculating the Implicit Rating Value

For calculating the implicit rating value we need to create a baseline for comparison.

The most sensible baseline is one that represents the average number of plays per customer for all Artists/Albums/Tracks/Playlists that have been fully played at least once by each individual customer (i.e. it is not fair to include Artists/Albums/Tracks/Playlists that have never been listened to within the calculation). We can that take this baseline to represent a 2.5 rating within the system, and adjust all other ratings up or down accordingly by normalising the distribution to around the 2.5 rating value.

As an example, if the average number of plays per customer for the Track: Angels—Robbie Williams is 12.90, and the average number of plays for all Tracks (that have had at leas one full play) per customer is 4.66, with a standard deviation of 4.23, then we would do the following:

Average plays per customer for Angels—Robbie Williams=12.90

Normalized plays (around a mean of 0)=(AV. PLAYS−OVERALL AV. PLAYS)/(STDEV)

Therefore, normalized plays (around a mean of 0)=(12.90−4.66)/4.23=1.95

Therefore, normalized plays (around a mean of 2.5 stars)= 2.5+1.95=4.45

(N.B. It is feasible that, in very extreme circumstances, this value could be <0, or >5. In this case we will cap the value at 0 or 5 accordingly). N.B. we use the MEAN average initially, but in any given embodiment we should also experiment with the MEDIAN average since the latter will have the effect of removing the influence of individual customers who just play one Artist/Album/Track/Playlist in an obsessive manner.

The overall representation of how this works in a universe of 6 Tracks is presented below:

|  | Average plays per customer | Normalized Plays (X − MEAN)/ STDEV | Rating Value (2.5 + NOR- MALISED PLAYS) |
|---|---|---|---|
| Angels - Robbie Williams | 12.90 | 1.95 | 4.45 |
| Country House - Blur | 4.60 | −0.01 | 2.49 |
| Life on Mars - David Bowie | 3.30 | −0.32 | 2.18 |
| Yellow - Coldplay | 1.23 | −0.81 | 1.69 |
| Bohemian Rhapsody - Queen | 4.01 | −0.15 | 2.35 |
| I Luv Ya - Atomic Kitten | 1.89 | −0.65 | 1.85 |
| Average overall plays per customer | 4.66 | | |
| Standard Deviation | 4.23 | | |

Calculating the Overall Rating Value

The overall 5-Star rating is calculated by simply taking the average of the implicit and explicit ratings, and rounding up to the nearest half star (round up since we want to be positive in what we present!).

Thus the overall rating for Angels—Robbie Williams= (3.53+4.45)/2=3.99

Therefore Angels—Robbie Williams receives a 4-star rating.

Calculating Ratings for Customers

The ratings for customers will be based upon a 50/50 average of:

1) The ratings and number of listens that a customer has had to their shared Playlists.

2) The number of friends the member has.

The former is calculated in a similar manner to that described in section 0, and likewise, for the implicit part, only considers Playlists that have been listened to by other customers and at least twice. Once we have the overall ratings for all the customer's playlists then we will simply take an average of all of them to produce a final rating (5 star or other more desirable representation).

The second part is calculated as the mean number of friends with respect to the average number of friends for the entire service data set, i.e:

Normalized friends (around a mean of 2.5)=2.5+(AV. PLAYS−OVERALL AV. PLAYS)/(STDEV)

At go-live, or when any new Artists/Albums/Tracks/Playlists/Customers come into the system, that their initial rating defaults to 3. Additionally we will have editorial tools that will allow us to increase or decrease this value for certain Artists/Albums/Tracks/Playlists/Customers prior to go-live, or when new Artists/Albums/Tracks/Playlists/Customers are entered into the system.

The invention claimed is:

1. A computer implemented method for automatically generating recommendations for digital media content for a first user by configuring a processor to (a) analyze digital media and its associated metadata for media that is used by a first user and (b) use that analysis to provide, for that first user, recommendations of both additional digital media content and also recommendations of other users with similar preferences to that first user.

2. The method of claim 1 including further configuring said processor to perform the steps of analysing digital media and associated metadata that is used by other users and then identifying those other users with preferences that are similar to the first user; and in which the recommendations for the first user are based on analysing the digital media and associated metadata that are used by those other users with preferences that are similar to the first user.

3. The method of claim 1 in which the recommendations of other users include one or more of: the names of those other users, playlists of those other users, currently being played by those other users, personal favourites or other recommendations of those other users.

4. The method of claim 1 further comprising configuring said processor to perform the step of locating and identifying existing digital media used by a first user prior to analysing that digital media.

5. The method of claim 4 where the existing digital media used by a first user is located by a computer implemented process of searching for digital media files on one or more of (a) device(s) or used by the first user, including but not limited to one or more of computers, mobile devices, media players and games consoles; (b) online storage facilities accessed by the first user; (c) physical storage media, including but not limited to Compact Discs (CDs) and Digital Video Disks (DVDs); (d) digital media content played by the first user on media players on his said device(s).

6. The method of claim 4 where the digital media is identified by configuring said processor to perform one or more of: (a) analysing a file name; (b) examining digital tags stored in the file, including but not limited to explicitly embedded tags, such as ID3 tags used in MP3 files; (c) examining associative tags, such as album artwork associated image files used by media players; (d) examining metadata stored in a media player's database, including but not limited to the genre classification of a track; (e) reading metadata associated with physical media, such as CDText data and/or serial numbers on a storage medium such as a Compact Disc or any other storage medium.

7. The method of claim 1 where the digital media is identified by processing a file using a Digital Signal Processing (DSP) algorithm and comparing the signature so produced to a database of such signatures.

8. The method of claim 1 where the associated metadata is obtained by locating the identified digital media item within a database of such metadata.

9. The method of claim 1 where the associated metadata includes metadata obtained by processing the file using a Digital Signal Processing (DSP) algorithm to extract one or more of (a) the mood, tempo and/or beat of a piece of music; (b) the language(s) used within a given piece of digital media content; (c) and other metadata which may be obtained using the said DSP algorithm(s).

10. The method of claim 1 where the associated metadata includes playback metrics for the digital media file, the playback metrics being obtained by one or more of (a) examining playback metrics recorded by media players on the user's device; (b) examining file access metadata recorded by the operating system on the user's device, including but not limited to the "last access date" of NTFS file systems; (c) recording playbacks of media items as digital media items are played by the said user on the said device.

11. The method of claim 1 where the metadata includes ratings assigned to digital media items and/or groups of digital media items.

12. The method of claim 11 where the ratings are assigned by one or more of (a) users of a digital media service; (b) any other individuals, including but not limited to employees of a digital media service; (c) analysis of metadata associated with digital media items, including but not limited to databases indicating relationships between digital media items and/or groups of digital media items such as artists, authors and/or albums.

13. The method of claim 1 where the metadata includes records of the interaction between the first user and the digital media items available to the first user's device(s).

14. The method of claim 1 where the metadata includes the demographics of the first user.

15. The method of claim 1 where the metadata includes records of the interaction between the other users of a digital media service and digital media items available to the other users and their device(s), where an association is noted between the first user and the other users based on one or more of their demographics; their device type(s); their locale or any other available metadata.

16. The method of claim 1 where the metadata is analysed by creating a matrix describing the first user's interactions with the digital media, including some group of digital media including but not limited to artists, authors, albums or any other grouping.

17. The method of claim 16 where the metadata is analysed by creating a matrix that captures the correlation between the first user's interactions with the digital media and other users' interaction with the digital media that they use.

18. The method of claim 16 where the matrix is weighted such that those interactions which are most relevant to the process of generating recommendations are given a proportionally higher weighting in the matrix by using a frequency analysis algorithm, by adjusting weightings according to the playback metadata or by any other method such that either a higher or a lower value is indicative of a correlation between two items in the matrix.

19. The method of claim 16 where the matrix is normalised.

20. The method of claim 16 where the recommendations of digital media items, of users and/or of groups of digital media items are obtained by locating correlating values in the said matrix.

21. The method of claim 1 where the recommendations of digital media items, of users and/or of groups of digital media items are obtained by the analysis performed by any other recommendation algorithm.

22. The method of claim 1 where the first user is a group consisting of more than one individual user.

23. A computer implemented system for automatically generating recommendations for digital media content, in which the system is adapted to (a) analyse the digital media and its associated metadata and (b) use that analysis to provide, for that first user, recommendations of both additional digital media content and also recommendations of other users with similar preferences.

* * * * *

UNITED STATES PATENT AND TRADEMARK OFFICE
Certificate

Patent No. 8,645,373 B2                                                                 Patented: February 4, 2014

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Mark Knight, London (GB); Christopher Evans, London (GB); Tom Boswell, London (GB); Philip Sant, London (GB); Stephen Pocock, London (GB); Michael Lamb, London (GB); and Mark Sullivan, London (GB).

Signed and Sealed this Twenty-fifth Day of March 2014.

*SHERIEF BADAWI*
*Supervisory Patent Examiner*
Art Unit 2156
Technology Center 2100